July 9, 1968 G. M. KIRKPATRICK 3,392,387
CLUTTER ATTENUATION RADAR
Filed Jan. 4, 1967 2 Sheets-Sheet 1

INVENTOR.
George M. Kirkpatrick
BY
*Yuter & Spiecens*
ATTORNEYS

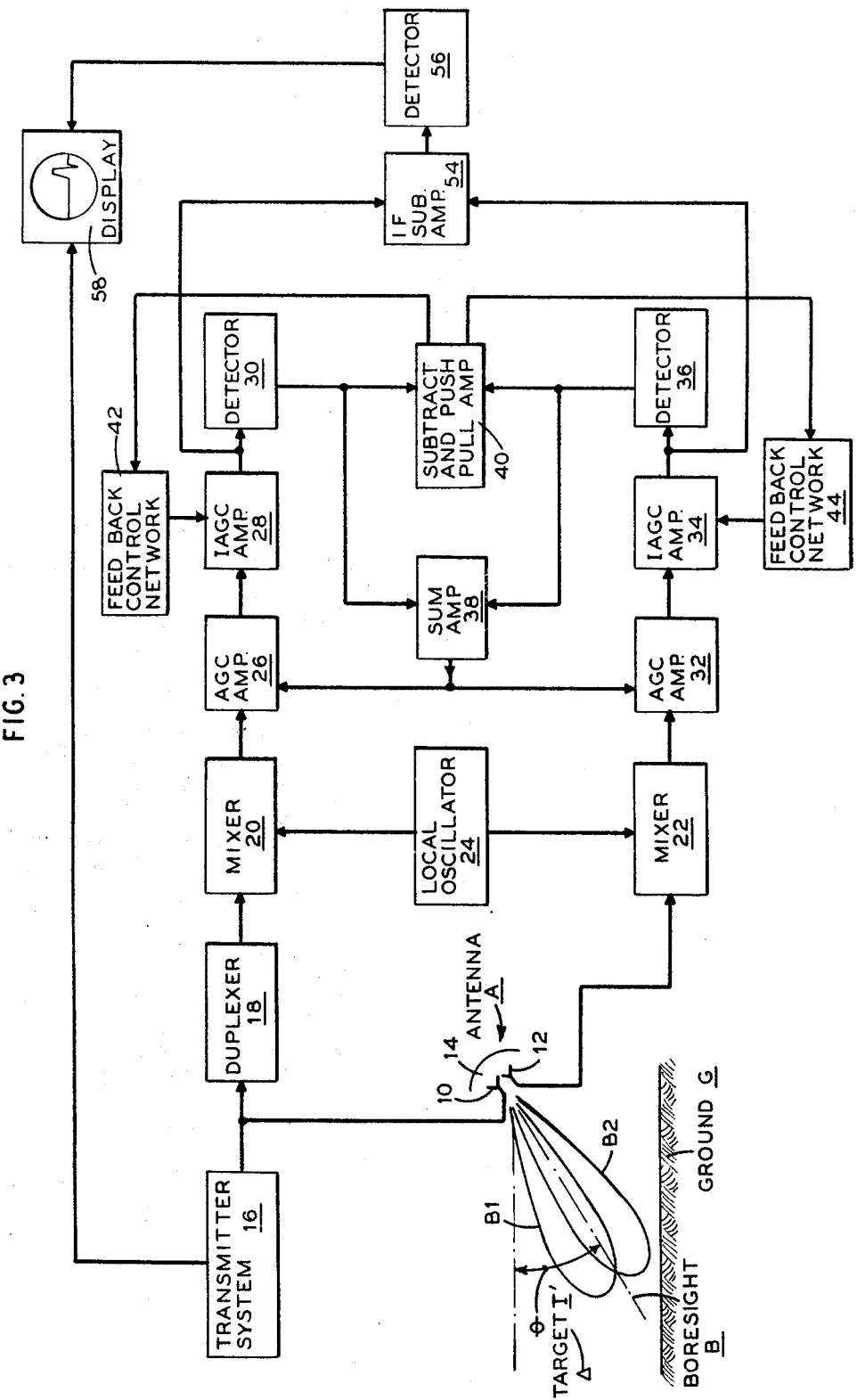

United States Patent Office 3,392,387
Patented July 9, 1968

3,392,387
CLUTTER ATTENUATION RADAR
George M. Kirkpatrick, North Syracuse, N.Y., assignor to Research Corporation, New York, N.Y., a nonprofit corporation of New York
Filed Jan. 4, 1967, Ser. No. 607,331
7 Claims. (Cl. 343—16)

ABSTRACT OF THE DISCLOSURE

An airborne radar system utilizing monopulse techniques has an antenna with two radiators. The antenna beams of the radiators are angularly displaced from each other in the elevation plane. The transmitter feeds range pulses to one of the radiators which then illuminates a region including the ground in the elevation plane. Echoes received by the radiators are fed to first and second receivers. The signals generated by the receivers are subtracted. The difference signal is fed in a push-pull manner to the receivers causing the beams to effectively angularly scan the elevation plane following the ground clutter echo and effectively nulling the difference signal. Display means also receive a signal which is related to the difference of the signals generated by the receivers. The signal received by the display means is displayed as a function of time. When a target echo is sufficiently displaced from the ground clutter echo its range will be indicated by the display means.

---

This invention pertains to airborne radar and more particularly to radar for detecting an elevated target or obstacle obscured by nearby clutter.

Clutter is defined as a conglomeration of unwanted radar echoes. Such echoes "clutter" the radar display and make difficult the recognition of wanted echo signals.

In airborne collision avoidance radar systems, ground clutter presents the greatest problems. In such systems it is necessary to detect elevated targets such as other aircraft or obstacles such as towers, buildings, etc. Since the radar cross section of the ground clutter is often greater than the radar cross section of the target, the target echoes are embedded and lost in the ground clutter echoes.

When the target is another aircraft an MTI radar system can be used to separate the target from the ground clutter. However, such radar systems are quite complicated and they cannot easily detect "fixed" targets such as towers or buildings.

Accordingly, the invention solves these problems by enhancing elevated target echoes with respect to ground clutter in an airborne radar system. In particular, the invention contemplates scanning the radiation reception pattern through a range of elevation angles. All echoes received in a direction equal to the instantaneous elevation angle of the scan are rejected while echoes from other angles are accepted. More particularly, the region to be searched is illuminated with at least the elevation beam of a monopulse radar while continuously pointing or aiming the reflection null of the elevation beam at the ground clutter and sensing for echoes received at elevation angles other than the elevation angle at which the reflection null of the elevation beam is pointing. Accordingly, the ground clutter echoes are suppressed and only the target signals from elevated objects are displayed.

Other objects, features and advantages of the invention will be apparent from the following detailed description when read with the accompanying drawings which show by way of example and not limitation apparatus for practicing the invention.

In the drawings:

FIGURE 3 is a schematic diagram of an airborne radar system which automatically scans in the elevation plane in accordance with the invention.

Since the invention relies on the monopulse technique of tracking radar, this technique will be briefly described. With such a technique, angle information can be obtained from a single pulse (a packet of radio frequency electromagnetic energy) by simultaneously using at least two antenna beams. The angle of arrival of the echo signal can be determined with a single pulse by measuring the relative phase or the relative amplitude of the echo pulse signal received in each beam. In an amplitude-comparison monopulse system RF signals received from two offset antenna beams are combined to form at least the difference signal. The difference signal will have a null along the direction of the centerline of the antenna beams to the echo source.

Now, a method of reducing an undesired signal is to place a null response at the location (frequency, angle or time) of the undesired signal, provided the separation between the desired and the undesired signal locations is large enough. According to the invention the monopulse technique is utilized to place a null in the elevation angle so as to reduce the ground clutter received by an airborne radar system. The monopulse null is caused to scan in elevation angle so as to maintain the null at the angle of arrival of the echo from clutter elements. As the transmitted range pulse sweeps outward along the ground and reflects from ground clutter, the null in the elevation plane scans through the elevation angles and the range display shows virtually no return. When a target is encountered displaced from the null direction no cancellation occurs and the range display shows the target.

Figure 1:
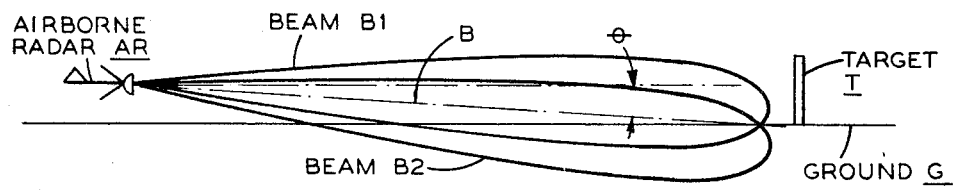
FIGURE 1 is a schematic representation of the antenna beams of an airborne radar system, according to the invention, searching for a target.
Figure 2:
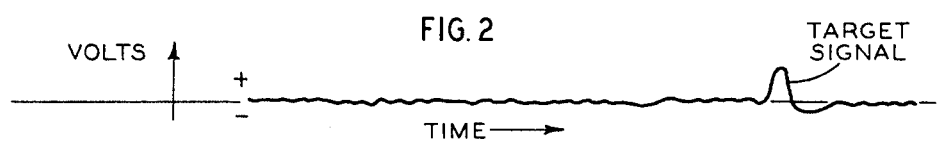
FIGURE 2 is a waveform diagram of voltage as a function of time representing the range display for the airborne radar system's encounter with a target as represented in FIGURE 1.

More particularly, in FIGURE 1 the airborne radar AR has two antenna beams B1 and B2 disposed in an angularly displaced and partially overlapping relationship in the elevation plane. As a range pulse is emitted it radially flows from the antenna toward the ground G. When energy in the pulse reaches the ground it illuminates a patch having an azimuth extent which is a function of the antenna configuration and a length which is a function of the range pulse. This patch of ground reflects clutter echoes back along both beams B1 and B2 to the antenna. The radar responds to this reflection by placing the boresight B of the beams on the patch and the ground clutter echo is nulled. As the range pulse continues to propagate away from the radar, the illuminated patch runs along the ground G and the radar AR continues to vary the elevation angle $\theta$ to follow the moving patch. As the boresight B points to the base of the target T (shown as a tower) the propagating wavefront will also encounter the upper portion of the target T returning an echo signal which will be displayed. The display will be pronounced since the clutter echo signals have been attenuated as indicated in FIGURE 2 which shows the display waveform for the above described range sweep.

The airborne radar AR of FIGURE 1 is shown in greater detail in FIGURE 3. An antenna A is provided with two radiators 10 and 12 and a reflector 14. The radiators and the reflector cooperate to form two overlapping antenna beams B1 and B2 having a common boresight B which scans through elevation angles θ in the elevation plane. The RF-signal output terminal of the transmitter 16 which includes a timer, a modulator and a transmitter feeds the range signals as RF-pulses (packets of RF-energy) to the radiator 10 for emission along antenna beam B2. While only one of the radiators is shown as being fed by transmitter system 16, both radiators can be energized. The radiation strikes the ground G and illuminates a clutter patch which returns clutter echo signals along beams B2 and B1, respectively, to radiators 10 and 12. The RF-signal picked up by radiator 10 passes through duplexer 18 which can include a TR-switch and an ATR-switch to mixer 20. The RF-signals picked up by radiator 12 are fed to mixer 22. The heterodyning signal from local oscillator 24 which feeds both the mixers causes them to convert the RF-signals to IF-signals. The IF-signals from mixer 20 are fed through automatic gain control amplifier 26 and instantaneous automatic gain control amplifier 28 to detector 30, while the IF-signals from mixer 22 are fed through automatic gain control amplifier 32 and instantaneous automatic gain control amplifier 34 to detector 36. The output of detector 30 is fed to one input of summing amplifier 38 whose other input receives the output of detector 36. The output of summing amplifier 38 is fed to the gain control inputs of automatic gain control amplifiers 26 and 32. Amplifiers 26 and 32, in addition to providing intermediate frequency amplification, minimize interference and receiver overload.

The outputs of detectors 30 and 36 are also fed to subtraction and push-pull amplifier 40. Amplifier 40 primarily performs the nulling operation of the monopulse technique. The difference signal formed by amplifier 40 is fed in push-pull relationship to the instantaneous automatic gain control amplifiers 28 and 34. In particular, one phase of the difference signal is fed via feedback control network 42 to the gain control input of amplifier 28, and the other phase of the difference signal is fed via feedback control network 44 to amplifier 34. Amplifiers 28 and 34 operating in conjunction with networks 42 and 44 and amplifier 40 cause the electronic scanning of the boresight B through the range of elevation angles to follow the null as it scans outward for matching the angle of arrival of the instantaneous clutter return.

The steering of the null or antenna beam crossover is accomplished by varying the gains of amplifiers 28 and 34 in a differential fashion. Increasing the gain of amplifier 28 causes the beam crossover to move up while increasing the gain of amplifier 34 causes the opposite action. Decreasing the gain of amplifier 28 causes downward motion of the crossover and decreasing the gain of amplifier 34 causes the opposite action. Changing the gain of both amplifiers 28 and 34 in the same direction constitutes gain control action and does not change the angular location of the crossover. The differential action of the feedback circuitry in steering the beam crossover (null) is illustrated by the FIGURE 4.

Figure 4:
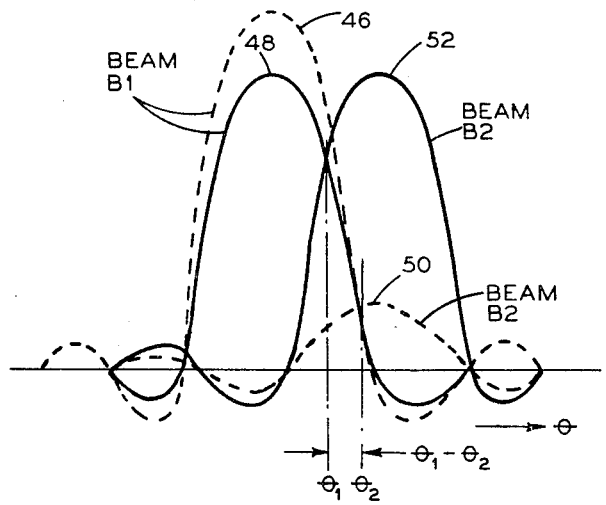
FIGURE 4 is a waveform diagram of echo signal amplitude as a function of elevation angle to illustrate the automatic scanning property of the airborne radar system of FIGURE 3.

Referring to FIGURE 4 the gain of amplifier 34 is increased (dotted line 46) above a nominal value (solid line 48) and the gain of amplifier 28 is decreased (dotted line 50) below the nominal value (solid line 52) and the beam crossover is shifted to the right from $\theta_1$ to $\theta_2$. Thus, as clutter echo signals return from greater ranges with increasing time, the beam crossover is made to stay centered on the clutter patch generating the clutter echo at a particular instant. The crossover (null) of the two beams B1 and B2 can be shifted through a limited angle as is apparent from FIGURE 4, and this angle is between plus or minus one-fourth to one-half beamwidth. Beyond this angular range, control can be shifted to another pair of antenna feeds or other techniques of angle control such as electrical scanning can be used. A combination of electrical scanning by phase-shifters and differential receiver gain control can also be used. Another method of covering all desired elevation angles is to limit the angular coverage on a particular pulse but to scan the antenna in elevation at a suitable rate to cover the desired sector.

Thus, there has been shown apparatus for tracking the ground clutter patch. The remainder of the circuitry is concerned with selecting and displaying the target echo which is from an elevated object such as target T' representing an aircraft. When the elevated object is encountered that has an elevation angle that differs from the instantaneous elevation angle of the clutter at the same range it will be displayed.

In particular, the outputs of the instantaneous automatic gain control amplifiers 28 and 34 are fed to intermediate frequency subtraction amplifier 54 which performs an amplitude subtraction. The amplitude-difference intermediate frequency signal is demodulated by detector 56 and fed to the Y-input of range display 58 which can be an A-scope. The X-input to the display 58 is from transmitter system 16 which establishes the time base for the display.

The system can be modified without departing from the basic inventive concept. For example, one of the outputs of the amplifier 40 can be connected to the Y-input of the display 58, thus dispensing with the intermediate frequency subtraction amplifier 54 and detector 56 with a minor sacrifice of accuracy. In addition, it is possible to use a single-ended subtraction amplifier for amplifier 40 and to delete one of the feedback control networks and the gain control portion of the associated amplifier 28 or 34. In such a case, the range of the elevation angle scan will be shortened.

Since all of the specific elements are well known in the art, they will not be discussed in detail. Such circuits are the subject matter of many publications and all of the circuits, plus a description of monopulse techniques, can be found in "Introduction to Radar Systems" by Merrill I. Skolnik, published by McGraw-Hill Book Company, New York, in 1962.

There has thus been shown improved methods and apparatus for minimizing or attenuating ground clutter in an airborne radar system by utilizing monopulse techniques which cause the antenna beams to scan in elevation angles to position the monopulse null in the moving ground clutter patch direction.

While only one embodiment of the invention has been shown and described in detail there will now be obvious to those skilled in the art many modifications and variations satisfying many or all of the objects of the invention but which do not depart from the spirit thereof as defined by the appended claims.

What is claimed is:

1. A ground-clutter-suppression radar system comprising antenna means having associated therewith two displaced antenna beams with a common boresight, transmitter means connected to said antenna means for causing said antenna means to emit periodic pulses of radiation along at least one of said beams, first receiver means connected to said antenna means for receiving echo signals from one of said beams, second receiver means connected to said antenna means for receiving echo signals from the other of said beams, means for subtracting the received echo signals, feedback means responsive to said signal subtracting means for repositioning said common boresight in order to null the result obtained by said signal subtraction means and thereby minimize ground clutter echo signals, and signal display means responsive to the difference of the echo signals received by said receiver means for indicating the position of a target angularly displaced from the instantaneous location of the source of the ground clutter echo signals.

2. The radar system of claim 1 wherein said antenna means includes means for radiating two antenna beams which partially overlap and are angularly displaced from each other in an elevation plane.

3. The radar system of claim 2 wherein said repositioning means includes means for controlling the signal gain of at least one of said signal receiver means.

4. The radar system of claim 2 wherein said repositioning means includes means for controlling the signal gain of said first and second receiver means in phase opposition.

5. An airborne radar system for enhancing the detection of elevated targets by suppressing the ground clutter comprising: antenna means including first and second radiator means for radiating two antenna beams which partially overlap and are angularly displaced from each other in the elevation plane; transmitter means for periodically emitting range pulses to at least one of said radiator means; first receiver means for receiving echo signals from said first radiator means in response to electromagnetic radiation received thereby; second receiver means for receiving echo signals from said second radiator means in response to electromagnetic radiation received thereby; signal subtraction means for amplitude subtracting the signals received by said first and second signal receiver means and generating first and second feedback control voltages in push-pull relationship; means receiving the first feedback control voltage for controlling the gain of said first receiver means; means receiving the second feedback control voltage for controlling the gain of said second receiver means whereby said antenna beams track a range-increasing source of ground clutter echo signals; and means connected to said receiver means for displaying the difference of the echo signals received by said receiver means as a function of time to simultaneously indicate an elevated target angularly displaced from the instantaneous position of the source of ground clutter echo signals.

6. An airborne radar system for enhancing the detection of elevated targets by suppressing the ground clutter comprising: antenna means including first and second radiator means for radiating two antenna beams which partially overlap and are angularly displaced from each other in the elevation plane; transmitter means for periodically emitting range pulses to at least one of said radiator means; first receiver means, said first receiver means including an IF-signal amplifier and an automatic gain control means for controlling the gain of said IF-signal amplifier; first heterodyning means connecting said first radiator means to said first receiver means for transmitting IF-signals to the IF-signal amplifier thereof; second receiver means including an IF-signal amplifier and an automatic gain control means for controlling the gain of said IF-signal amplifier; second heterodyning means connecting said second radiator means to said second receiver means for transmitting IF-signals to the IF-signal amplifier thereof; first and second detector means connected to the IF-signal amplifiers of said first and second receiver means, respectively, for demodulating the IF-signals received therefrom; signal subtraction means for amplitude subtracting signals received from said first and second detector means and for generating first and second feedback control voltages in push-pull relationship; means for transmitting the first feedback control voltage to the automatic gain control means of said first receiver means; means for transmitting the second feedback control voltage to the automatic gain control means of said second receiver means; and display means, said display means including IF-signal subtraction means connected to the IF-signal amplifiers of said first and second receiver means for generating a signal which is the difference of the received IF-signals, means for demodulating the IF-difference signals and means for displaying the demodulated IF-difference signals as a function of time.

7. An airborne radar system for enhancing the detection of elevated targets by suppressing the ground clutter comprising: antenna means including at least two radiator means for radiating at least two antenna beams which partially overlap and are angularly displaced from each other in the elevation plane; transmitter means for periodically emitting range pulses to at least one of said radiator means; a plurality of receiver means, each of said receiver means receiving echo signals from one of said radiator means, respectively, in response to electromagnetic radiation received thereby; signal subtraction means for amplitude subtracting the signals received by said receiver means and for generating feedback control voltages for controlling the gain of said receiver means so that said antenna beams track a range-increasing source of ground clutter echo signals; and means connected to said receiver means for displaying the difference of the echo signals received by said receiver means as a function of time to simultaneously indicate an elevated target angularly displaced from the instantaneous position of the source of ground clutter echo signals.

References Cited

UNITED STATES PATENTS

| | | | |
|---|---|---|---|
| 3,113,310 | 12/1963 | Standing | 343—16 |
| 3,189,900 | 6/1965 | Raabe | 343—16 |
| 3,309,701 | 3/1967 | Bollinger et al. | 343—16 X |

RODNEY D. BENNETT, *Primary Examiner.*

J. P. MORRIS, *Assistant Examiner.*